3,576,755
PHOTOCHROMISM IN PLASTIC FILM CONTAINING INORGANIC MATERIALS

Lawrence Joseph Patella and Sydney Arthur Giddings, Cincinnati, Ohio, Satyendra Kumar Deb, Stamford, Conn., and John Andrew Chopoorian, Franklin Lakes, N.J., assignors to American Cyanamid Company, Stamford, Conn.
No Drawing. Continuation of application Ser. No. 399,073, Sept. 24, 1964. This application May 7, 1968, Ser. No. 727,371
Int. Cl. G02b 7/10
U.S. Cl. 252—300        10 Claims

ABSTRACT OF THE DISCLOSURE

Compositions of matter comprising a polymeric material having dispersed throughout the body thereof metal compounds of the formula $$MX_mO_n(OR)_p$$

wherein M is niobium, tantalum, tungsten, hafnium or titanium, X is a halide, R is an alkyl radical of 1–2 carbon atoms, inclusive, an aryl radical of 6–10 carbon atoms, inclusive, or an $$-\underset{\underset{O}{\parallel}}{C}-R^1$$

radical, R' is an alkyl radical of 1–12 carbon atoms, inclusive or an aryl radical of 6–10 carbon atoms, inclusive, m and p are whole, positive integers of from 0–6, inclusive, and n is a whole positive integer of from 0–2, inclusive, the total of 2n plus m plus p being equal to the valence of the metal M, at least one of m and p being at least 1, are disclosed.

CROSS-REFERENCES TO RELATED APPLICATIONS

This application is a continuation of our copending application, Ser. No. 399,073, filed Sept. 24, 1964, now abandoned.

This invention relates to novel compositions of matter. More particularly, this invention relates to novel compositions of matter comprising a polymeric material and a transition metal compound. Still more particularly, this invention relates to novel compositions of matter comprising a polymeric material, a solvent therefor and a transition metal compound having the formula (I)        $MX_mO_n(OR)_p$ wherein M is a transition metal, X is a halide, R is an alkyl radical having from 1–12 carbon atoms, inclusive, an aryl radical having from 6–10 carbon atoms, inclusive, or an $$-\underset{\underset{O}{\parallel}}{C}-R^1$$

radical, R¹ is an alkyl radical having from 1–12 carbon atoms, inclusive, or an aryl radical having from 6–10 carbon atoms, inclusive, m and p are whole, positive integers of from 0–6, inclusive, and n is a whole, positive integer of from 0–2, inclusive, the total of $2n+m+p$ being equal to the valence of the metal M, at least one of m and p being an integer of at least 1.

We have discovered that certain plastic materials can be blended with certain transition metal compounds to produce compositions of matter which when formed into various articles such as sheets, films, and the like, change color when subjected to ultraviolet light and revert to their original color when subjected to near infrared light or a thermal treatment and which further exhibit the property of heat absorption in the near infrared.

The use of photochromic materials as active ingredients in such applications as data storage devices, absorbers for incident, high-intensity radiation, photochemical printing, variable transmission devices and the like is well known in the art. There has been, however, to our knowledge, no disclosure of the production of photochromic compositions of matter which can be colored by subjection to ultraviolet light and bleached by near infrared light. Furthermore, the prior art is silent in regard to photochromic compositions of matter which absorb in the near infrared to result in articles which have the property of photochromism with changes in transmission in the visible regions coupled with heat absorption in the near infrared.

It is therefore an object of the present invention to provide novel compositions of matter.

It is a further object of the present invention to provide novel compositions of matter comprising a plastic, and a transition metal compound.

It is a further object of the present invention to provide compositions of matter which are composed of a polymeric plastic material, a solvent therefor and a transition metal compound represented by Formula I, which compositions of matter are photochromic when formed into various shaped articles and also possess the property of heat absorption in the near infrared.

These and other objects of the present invention will become more apparent to those skilled in the art upon reading the more detailed description set forth hereinbelow.

PHOTOCHROMISM

Molecules or complexes which undergo reversible photo-induced color changes are termed photochromic systems. That is to say, in the absence of activating radiation, the system has a single stable electronic configuration with a characteristic absorption spectrum. When the system is contacted with ultraviolet irradiation the absorption spectrum for the system changes drastically, but when the irradiation source is removed, the system reverts to its original state.

Photochromism has been observed in inorganic and organic compounds both in solution and solid state. Although the exact mechanism of color change varies markedly in each individual system, there are two processes which account for most types of photochromic phenomena. The first process is the transformation of excited state electronic energy into vibrational and torsional twisting modes of the molecule. Usually, systems observed to be photochromic have very efficient routes for internal transformation of absorbed energy and are generally never fluorescent or phosphorescent. Internal transformation often takes very rapidly, that is to say, the primary process in the photo-production of a colored species often occurs in about a millimicrosecond. However, optical observation of the colored species normally takes considerably longer than this because of the very small amounts of colored material produced per unit time and the depletion of the color by the competing reverse reaction.

The second fundamental photo-electronic mechanism generally considered as producing photochromism is charge transfer. Most charge transfer phenomena in organic molecules are rapidly reversible and therefore produce no colored intermediate. However, in inorganic crystals, charge transfer absorption usually leads to a colored state in which the donor-acceptor crystals have been oxidized and reduced.

There are three major factors which govern the behavior of a photochromic system.

(A) Absorption of incident radiation

According to the quantum theory, each absorbed quantum creates one activated molecule and only absorbed radiation can produce a chemical change. Variables which control the number of photons absorbed include the concentration and extinction coefficient of the photochrome, the cell length, the screening coefficients of other components of the system, and the wavelengths of the incident radiation.

(B) Quantum yield

All excited molecules will not undergo transformation to the colored form, so that the quantum yields will generally be less than unity. Various deactivating processes which compete for the excited molecules include fluorescence, phosphorescence, permanent chemical change and the thermal release.

(C) The reverse reaction

In both the forward and reverse reactions, the concentrations of the colored form is dependent on the intensity of the radiation, the kinetics of the reverse reactions, and temperature and solvent sensitivity of the reactions. The kinetics for the reverse reaction will normally be controlling, however some reverse reactions are thermally sensitive and are accelerated by irradiation.

The terms "photochromic substance" or "photochromic material," and the like, as used in the instant disclosure, mean substances or materials, etc., which change their transmission or reflectance upon being subjected to ultraviolet or visible irradiation and subsequently revert to their original state upon subjection thereof to a different wavelength of radiation or removal of the initial ultraviolet source.

The ability of various materials to change color and to then revert back to their original color is not a new phenomena. In fact, such compounds have been widely used in various ways, as described above. Generally these compounds change their color when exposed to ordinary sunlight and revert back to their original color upon removal thereof from the rays of the sun. Various other materials, however, change color only when subjected to a certain degree of irradiation, and as such, sunlight will not affect them. High intensity radiation, such as 10–25 cal./cm.$^2$/sec. or more is necessary in regard to these compounds, while sunlight (0.2 cal./cm.$^2$/sec.) will affect the former.

The compositions of matter

As mentioned above, we have found that level compositions of matter can be produced by blending a polymeric material and a transition metal compound represented by Formula I, above, to produce a blend which can be formed such as by casting, etc., into various shaped articles which are photochromic. In a preferred modification, we have found that a solvent for the polymer should also be present in the novel compositions. The only critical requirement in regard to the blending of these components is that at least one of the polymer or the solvent, if present, must contain oxygen, either in combined or free form. That is to say, no photochromic phenomena is observable when the compositions of our invention are formed into shaped articles unless the solvent, the plastic, or both, contain oxygen in some form, such as combined with the other elements of the component in question or in free form, i.e., as an added entity, e.g., an impurity and the like. Of course, when no solvent is employed in our novel compositions, the polymeric component must be the oxygen-containing portion of the compositions claimed herein before any photochromic phenomena can be observed. Evidence of the criticality of the presence of oxygen can be seen from the various examples set forth hereinbelow.

Any thermoplastic resin can be used in the formation of our novel compositions of matter. That is to say, any polymeric material, synthetic or naturally occurring, which is thermoplastic in nature and which may be dissolved in a solvent or made molten, may be used herein. Evidence of the types of polymers useful in our invention can be obtained from the more detailed description thereof set forth immediately hereinbelow.

Examples of thermoplastic resinous or plastic materials which may be utilized in the preparation of the compositions of the present invention are the various esters of acrylic acid and methacrylic acid, e.g., those having the formula (II)

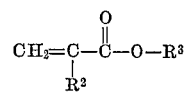

wherein $R^2$ is hydrogen or a methyl radical and $R^3$ is an alkyl radical having from 1 to 6 carbon atoms, inclusive. Compounds which are represented by Formula II and consequently may be used as monomers from which the polymers used in the present invention may be produced include methyl acrylate, ethyl acrylate, n-propyl acrylate, isopropyl acrylate, n-butyl acrylate, isobutyl acrylate, t-butyl acrylate, n-amyl acrylate, isoamyl acrylate, t-amyl acrylate, hexyl acrylate, methyl methacrylate, ethyl methacrylate, n-propyl methacrylate, isopropyl methacrylate, n-butyl methacrylate, isobutyl methacrylate, t-butyl methacrylate, n-amyl methacrylate, isoamyl methacrylate, t-amyl methacrylate hexyl methacrylate and the like Other polymers which may be employed are those produced from styrene monomers, e.g., those having the formula (III)

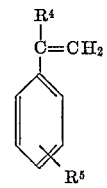

wherein $R^4$ is hydrogen or a lower alkyl radical having 1 to 4 carbon atoms, inclusive, and $R^5$ is hydrogen, a lower alkyl radical having 1 to 4 carbon atoms, inclusive or a halogen radical. Suitable monomers represented by Formula III include styrene, methyl styrene, ethyl styrene, propyl styrene, o-, m-, or p-butyl styrene, o-, m-, or p-chloro styrene, o-, m-, or p-bromo styrene, o-, m-, or p-fluoro styrene, o-, m-, or p-iodo styrene, α-methyl styrene, α-ethyl styrene, α-butyl styrene, α-methyl-o, m or p-methyl-styrene, α-methyl-o, m or p-ethylstyrene, α-butyl-o, m or p-ethylstyrene, α-ethyl-o, m or p-chlorostyrene, α-propyl-o, m or p-iodostyrene and the like.

Further examples of polymers which may be utilized to produce the novel compositions of the present invention include polymers of acrylonitrile, polymers of acrylamide, polymers of vinyl halides such as poly(vinyl chloride); polymers of vinylidene halides such as poly-(vinylidene chloride); polymers of vinyl carbonate, and vinyl alcohol; vinyl acetate, vinyl butyral; various aldehydes, such as oxymethylene, acetaldehyde, crotonaldehyde polymers of ethyleneoxide, cellulose polymers such as cellulose acetate butyrate, cellulose triacetate, and any other polymeric material with which the transition metal compound is compatible in the molten state and preferably which may be dissolved in an appropriate solvent.

Additionally, the monomers represented by Formulae I and II above, and which are disclosed hereinabove as useful for producing homopolymers can be copolymerized either singly or in a plurality (two, three, four or any desired number), the latter often being desirable in order to improve the compatibility and copolymerization characteristics of the mixture of monomers with themselves or various other copolymerizable monomers to obtain copolymers having the particular properties desired for the particular service application. Examples of such comonomers are the unsaturated alcohol esters, more particularly the allyl, methallyl, 1-chlorallyl, 2-chloroallyl, cinnamyl, vinyl, methvinyl, 1-phenylallyl, etc., esters of saturated aliphatic and aromatic monobasic and polybasic acids such, for instance, as acetic, propionic, butyric, valeric, caproic, oxalic, malonic, succinic, glutaric, adipic, pimelic, suberic, azelaic, sebacic, benzoic, phenylacetic, phthalic, terephthalic, benzoylphthalic, etc., acids; vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, unsaturated ethers, e.g., ethyl vinyl ether, diallyl ether, ethyl methallyl ether, etc.; unsaturated amides, for instance, N-allyl caprolactam, N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.

Further examples of thermoplastic polymers useful in producing our novel compositions are thermoplastic polyesters such as those produced by reacting a saturated aliphatic diol with a non-polymerizable polycarboxylic acid to produce a polyester having an acid number not appreciably more than 75. Among the dihydric alcohols which may be employed are saturated aliphatic diols such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts, together with the above-mentioned diols, are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

Non-polymerizable polycarboxylic acids, i.e., acids which are saturated or which contain only benzenoid unsaturation, which may be used include oxalic, malonic, succinic, glutaric, adipic, pimelic, suberic, azelaic, sebacic, malic tartaric, tricarballylic, citric, phthalic, isophthalic, terephthalic, cyclohexanedicarboxylic, endomethylenetetrahydrophthalic, and the like, as well as mixtures thereof.

The esterification mixtures, from which the thermoplastic polyester resins employed in the practice of the present invention are prepared, are generally formulated so as to contain at least a stoichiometric balance between carbonyl and hydroxyl groups. Thus, where a diol and a dicarboxylic acid are employed, they are usually reacted at elevated temperatures and in an inert atmosphere, on at least a mole to mole basis. In common commercial practice, a small excess of polyol, usually in the range of from about 5% to about 15% excess, is employed. This is done primarily for economic reasons, i.e., to insure a rapid rate of esterification.

Further details pertaining to the preparation of polyester resins of the types employed in the practice of the present invention are disclosed in U.S. Pat. No. 2,255,313 to Ellis, and in U.S. Pat. Nos. 2,443,735 to 2,443,741, inclusive, to Kropa, and these patents are hereby incorporated into the present application by reference.

As further examples of polymeric materials which may be used to produce our novel compositions of matter are the polyamide resins, i.e., those produced from a dibasic acid and a polyamine. Polyamide resins of this type are well known in the art and are generally termed "nylon" resins. These nylon resins, as used in the instant specification, are long chain synthetic polymeric amides which have recurring amide groups as an integral part of the main polymer chain and which are capable of being formed into a filament in which the structural elements are oriented in the direction of the axes. Most common of these nylons or polyamides are obtained by condensation of a diamine with a dicarboxylic acid or by auto-condensation of an amino acid. These polyamides have the structural formula (IV)  $(..NH(CH_2)_y NHCO(CH_2)_y CONH(CH_2)_x ..)$ $x$ and $y$ being greater than one. Methods for the production of polyamides of this type are shown, for example, in the following patents: U.S. Pat. Nos. 2,191,556; 2,293,760; 2,293,761; 2,327,116; 2,359,877; 2,377,985; 2,572,843, said patents hereby being incorporated herein by reference.

Additionally, we may utilize such polymeric materials as the polyurethanes. Any polyester based or polyether based polyurethane resin may be used in the present invention. Among the reactive organic polyfunctional polyols employed in preparing one class of polyurethane resins used in the practice of our invention by reaction with a suitable isocyanate compound are the polyalkylene ether, thioether, and ether-thioether glycols represented by the general formula (V)  $HO-(R^6 X^1)_z-H$ wherein $R^6$ represents the same or different alkylene radicals containing up to about 10 carbon atoms, $X^1$ represents oxygen or sulfur, and $z$ is an integer large enough so that the molecular weight of the polyalkylene ether, thioether, or ether-thioether glycol is at least about 500, e.g., from about 500 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene and anthrylene radicals, either unsubstituted or substituted, e.g., with alkyl or aryl groups, and the like, in place of some of the alkylene radicals of said polyalkylene glycols may also be employed. Polyalkylenearylene glycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art and forms no part of the present invention per se, it may be mentioned here by way of illustration that polyesters of this type may be prepared by the condensation of a polyhydric alcohol, with a polycarboxylic acid or anhydride in the same manner as set forth hereinabove in regard to the dissertation on applicable polyester resins which may be used herein, with the same examples of reactants applying in both instances.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

The polyurethane resins useful as a component of our novel compositions may be prepared using a wide variety of organic polyisocyanates, among which there are included aromatic diisocyanates, such as m-phenylenediisocyanate, p-phenylenediisocyanate, 4-t-butyl-m-phenylenediisocyanate, 4 - methoxy - m - phenylenediisocyanate, 4-phenoxy-m-phenylenediisocyanate, 4-chloro-m-phenylenediisocyanate, toluenediisocyanates (either as a mixture of isomers, e.g., the commercially available mixture of 80% 2,4-toluenediisocyanate and 20% 2,6-toluenediisocyanate, or as the individual isomers themselves), m-xylylenediisocyanate, p-xylylenediisocyanate, cumene-2,4-diisocyanate, durenediisocyanate, 1,4-naphthylenediisocyanate, 1,5-naphthylenediisocyanate, 1,8 - naphthylenediisocyanate, 2,6 - naphthylenediisocyanate, 1,5 - tetrahydronaphthylenediisocyanate, p,p′ - diphenyldiisocyanate, diphenylmethane - 4,4′ - diisocyanate, 2,4 - diphenylhexane - 1,6-diisocyanate, "bitolylenediisocyanate" (3,3′-dimethyl-4,4′-biphenylenediisocyanate), "dianisidinediisocyanate" (3,3′-dimethoxy - 4,4′ - biphenylenediisocyanate), and polymethylenepolyisocyanates represented by the general formula

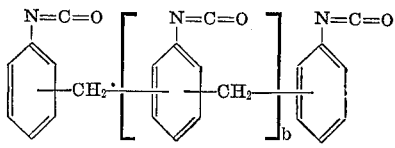

wherein $b$ represents an integer between 0 and about 5, and the like; aliphatic diisocyanates, such as methylenediisocyanate, ethylenediisocyanate, the tri-, tetra-, penta-, hexa-, hepta-, oct-, non- and decamethylene-$\omega,\omega$-diisocyanates, 2-chlorotrimethylenediisocyanate, 2,3-dimethyltetramethylenediisocyanate, and the like, and tri- and higher isocyanates, such as benzene-1,3,5-triisocyanate, toluene-2,4,6-triisocyanate, diphenyl-2,4,4′-triisocyanate, triphenylmethane-4,4′,4″-triisocyanate, and the like. Mixtures of two or more of such organic polyisocyanates may also be employed to prepare the polyurethane resins by reaction with the ethers and esters described above utilizing procedures well known to those skilled in the art, see for example, U.S. Pats 2,729,618; 3,016,364 and the like.

As mentioned above, the polymer component of our novel compositions may be used as a molten material or as a solution thereof in a solvent. While the use of a solvent is preferred, it is not critical. The actual solvent employed in each instance is not critical except for the fact that it is preferred that the solvent contain an oxygen atom, as specified above. Generally, any compound which is a solvent for the polymer may be employed for this purpose in a sufficient amount so as to dissolve the polymer employed, provided that at least the polymer or the solvent contains oxygen, as mentioned above.

Examples of solvents which may be utilized include dimethyl formamide, acetonitrile, methylene chloride, glyme, ($CH_3OCH_2CH_2OCH_3$), diglyme

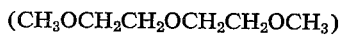

chloroform, ethyl acetate, methylene chloride, trioxane, dioxane, ethyl formate, ethylene dichloride, isopropyl acetate, methyl acetate, acetic acid, acetone, benzil, acetaldehyde, benzaldehyde, butyl acetate, cellosolve, cyclohexanol acetate, cyclohexanone, methylethylketone, toluol, gamma-valerolactone, methanol, ethanol, hexanol, nitrobenzene, nitropropane, trichloroethylene, aniline, diacetone alcohol, ethyl lactate, carbon tetrachloride, pyridine, toluol, xylol, ethylene glycol, water and the like.

Additionally, any specific polymer may be dissolved in one of its own constituents so as to form a solution thereof. That is to say, poly(methyl methacrylate), for example, can be utilized as a solution of the polymer in methyl methacrylate. Likewise, other polymers may also be used as solutions thereof in monomers of which they are composed.

Furthermore, mixtures of the above-mentioned solvents or other solvents which conform to the requirements set forth herein, may be used to solubilize the polymers. For example, methylene chloride and acetic acid in a 50/50 mixture may be used with poly(methyl methacrylate).

In many instances, the polymers, as a result of solvents used during production thereof, or the solvents, as a result of affinity or weak bonding reactions, may contain a minor or trace amount of an impurity such as water and the like. In instances of this sort, no newly added solvent need be added to produce our novel compositions if the critical oxygen requirement mentioned above has been fulfilled. By the term "trace amounts" or "impurities" is meant amounts as minimal as 0.1% are tolerable and generally sufficient to enable the production of a photochromic article.

Examples of transition metal compounds which may be utilized in producing the compositions of matter of the present invention and which are represented by Formula I, include titanium tetrachloride,
titanium oxidedichloride,
zirconium tetrachloride,
zirconium oxidedichloride,
tungsten hexachloride,
tungsten oxidetetrachloride,
tungsten dioxidedichloride,
hafnium tetrachloride,
hafnium oxidedichloride,
tantalum pentachloride,
tantalum oxidetrichloride,
tantalum dioxidechloride,
titanium tetrabromide,
titanium oxidedibromide,
zirconium tetrabromide,
zirconium oxidedibromide,
tungsten hexabromide,
tungsten oxidetetrabromide,
tungsten dioxidedibromide,
hafnium tetrabromide,
hafnium oxidedibromide,
tantalum pentabromide,
tantalum oxidetribromide,
tantalum dioxidebromide,
titanium tetraiodide,
titanium oxidediiodide,
zirconium tetraiodide,
zirconium oxidediiodide,
tungsten hexaiodide,
tungsten oxidetetraiodide,
tungsten dioxidediiodide,
hafnium tetraiodide,
halfnium oxidediiodide,
tantalum pentaiodide,
tantalum oxidetriiodide,
tantalum dioxideiodide,
titanium tetrafluoride,
titanium oxidedifluoride,
zirconium tetrafluoride,
zirconium oxidedifluoride,
tungsten hexafluoride,
tungsten oxidetetrafluoride,
tungsten dioxidedifluoride,
hafnium tetrafluoride,
hafnium oxidedifluoride,
tantalum pentafluoride,
tantalum oxidetrifluoride,
tantalum dioxidefluoride,
chromium dioxide dichloride,
chromium dioxide dimethoxide,
vanadium oxide trichloride,
vanadium oxide triiodide,
vanadium dioxide bromide,
vanadium dioxide methoxide,
titanium tetramethoxide, titanium tetraethoxide,
titanium tetraheptoxide,
titanium tetradodecoxide,
titanium oxide dimethoxide,
titanium dichloride dimethoxide,
titanium trichloride ethoxide,
titanium chloride trimethoxide,
zirconium tetramethoxide,
zirconium tetraphenoxide,
zirconium tetra(p-tolyloxide),
zirconium tetra(1-naphthoxide),
zirconium oxide dimethoxide,
zirconium oxide diphenoxide,
zirconium dibromide diethoxide,
zirconium trifluoride butoxide,
zirconium iodide trimethoxide,
hafnium tetraacetate,
hafnium tetravalerate,
hafnium tetralaurate,
hafnium oxide diacetate,
hafnium dibromide divalerate,
hafnium trifluoride laurate,
hafnium chloride triphenoxide,
tantalum pentamethoxide,
tantalum pentabenzoate,
tantalum penta(p-toluate),
tantalum penta(2-naphthoate),
tantalum oxide tribenzoate,
tantalum dioxide methoxide,
tantalum dichloride triethoxide,
tantalum tetrabromide acetate,
tantalum bromide tetraphenoxide,
tantalum trifluoride dimethoxide,
tungsten hexamethoxide,
tungsten oxide tetrabenzoate,
tungsten dioxide diacetate,
tungsten pentachloride methoxide,
tungsten tetrabromide bis(p-toluate),
tungsten triiodide tris(p-tolyloxide),
tungsten dichloride tetravalerate,
tungsten bromide penta(1-naphthoate)

and the like. The amount of transition metal employed may range from 0.01% to 50.0%, by weight, based on the weight of the polymer, preferably 0.1% to 25.0%, by weight, same basis.

The transition metal compounds listed above are all well known in the art and may be produced by an equally well known procedure. Examples of applicable methods for the production thereof appear in at least one of the following articles. Razivaer et al. Tetrahedron 6, 159, (1959); Sandho et al. Current Sci. (Ind) 29, 222, (1960); Rosenheim, Ch. Nernst. Z. Anorg. Chem. 214, 220, (1933); Bradley et al. J. Chem. Soc. (1953), 1634, and these references are hereby incorporated herein by references.

The order of addition of the components to form our novel compositions is not critical and any method of blending may be used. For example, the solvent may be added to the polymer and then the transition metal compound may be added or the metal and solvent may be blended and the resultant solution may then be added to the resin. Of course, if the polymer is used in a molten state in the absence of solvent, the metal is merely added thereto as such and admixed thoroughly. The components may be thoroughly admixed by utilizing such means as a Waring Blendor, a ball mill and the like, the method of blending or adding the components to one another forming no part of the instant invention.

The novel compositions of the instant invention may be cast into films from a solution of the solvent by drawing the composition down on a self-supporting substrate such as glass, metals, such as steel, tin and the like, a resinous material such as polyethyleneglycol terephthalate, paper, cellophane, marble, wood, leather, cloth and the like, or merely casting on any solid surface and removing the resultant film. The thin film which is deposited by casting in this method generally should range in thickness from about 0.1 mil to about 1000 mils, preferably 0.5 mil to about 125 mils, to produce an optimum photochromic effect.

The exact phenomena which occurs upon blending the components of the compositions claimed herein is not completely understood. It is known however, that the compositions are not photochromic unless at least the thermoplastic resin or the solvent, or both, contain oxygen, in free or combined form, and until the compositions are formed into a definite shaped article, such as by casting. While we do not wish to be bound by any explanation of the photochromic mechanism which results or theory in regard thereto, it is possible that the active material may be formed by the formation of a metal adduct with the polymer. For example, utilizing poly(methyl methacrylate) and tungsten hexachloride, the photochromism could possibly result by formation of a tungsten addition product with a reactive oxygen in the polymer. The same result could also occur when the solvent present, if any, has a reactive oxygen therein.

The mechanism of the photochromic change is possibly an electron transfer reaction, mentioned above, wherein electrons are transferred from the polymer and/or solvent by ultraviolet excitation to give reduced tungsten. The reverse process is possibly a relaxation of this configuration as follows in the case of a tungsten addition product:

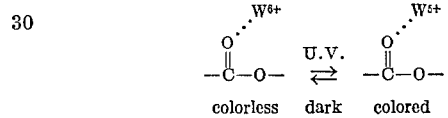

The scope of the present invention is also of such breadth so as to include the use of such modifying materials as fillers, lubricants, plasticizers, stabilizers, antioxidants and the like as additives to the novel compositions claimed herein.

The novel compositions of the present invention may be used to produce such articles as plastic window panes, sky lights, automobile windshields, sunglass lenses, memory devices such as optical analogue computers, temporary oscillographs, temporary photographic proofs, photographic marking devices, light switches, optical masks, wall panels, jewelry, toys, advertising articles and the like.

The following examples are set forth for purposes of illustration only and are not to be construed as limitations on the instant invention except as set forth in the appended claims. All parts and percentages are by weight unless otherwise specified.

EXAMPLE 1

A film dope is prepared by blending poly(methyl methacrylate) with a solvent mixture of methylethylketone and methylisobutylketone (75/25) to produce a system containing 20% of the polymer and 80% of the solvent. 2.5 parts of tungsten hexachloride is added to this solution and hydrochloric acid begins to evolve. The water-white solution passes through a series of color changes from straw to ink blue. After the acid evolution stops, nitrogen is passed over the solution for twenty minutes and a film is then cast by drawing the solution down on a sheet of polyethyleneglycol terephthalate to a thickness of 0.9 mils. The casting is dried for 16 hours at room temperature and a colorless film results. The film is transparent, very hard and rigid.

The film is subjected to a light beam from a high pressure mercury lamp with a quartz envelope, after passing through an ultraviolet light band filter, to give an 0.1 milliamp reading on a selenium photocell. The band pass filter is then removed and the film is irradiated for various time intervals and the changes in the near infrared, visible and ultraviolet spectra are followed on a spectrophotometer. A strong band in the near infrared, having a maximum at 1000 mµ, is observed. Table I, below, shows the effect of the ultraviolet light on the optical density for various concentrations of the tungsten hexachloride. As the concentration increases the ambient optical density increases up to about 3 and the film turns gradually to a deep blue in color.

TABLE I

| Concentration, percent $WCl_6$ | Optical density [1] after— | | | | |
|---|---|---|---|---|---|
| | 0 min. | 5 min. | 15 min. | 35 min. | 75 min. |
| 4 | 0 | 0.30 | 0.36 | 0.39 | 0.41 |
| 5 | 0.04 | 0.43 | 0.48 | 0.50 | 0.50 |
| 6 | 0.20 | 0.71 | 0.76 | 0.77 | 0.77 |
| 10 | 0.10 | 0.64 | 0.76 | 0.82 | 0.82 |
| 12.5 | 0.08 | 0.78 | 0.96 | 1.01 | 1.03 |
| 15 | 0.16 | 0.94 | 1.00 | 1.04 | 1.07 |

[1] Change in optical density at 1,000 mµ with time of U.V. irradiation as a function of concentration.

Table II, below, compares the rate of coloration of the film when subjected to a mercury lamp and a sunlamp. When the film is placed in the dark at room temperature

TABLE II

| | Concentration, percent $WCl_6$ | Optical density | | | | |
|---|---|---|---|---|---|---|
| | | 0 min. | 5 min. | 15 min. | 35 min. | 75 min. |
| Hg lamp | 10 | 0.10 | 0.64 | 0.76 | 0.82 | 0.82 |
| Sunlamp | 10 | 0.12 | 0.38 | 0.48 | 0.48 | 0.47 | for 8 hours, it fades to its colorless form. Heating of the film to about 5° C. increases the rate of bleaching so that the film is colorless in 2 hours. Subjection of a bleached film to ultraviolet light again colors the film blue.

Following the procedure of Example 1, various other compositions are produced according to the instant invention. Films cast from said compositions exhibit a color change when subjected to ultraviolet light and revert to their original color when removed from said light. The results of the runs are set forth in the previous Table III. Comparative results are also shown of compositions not produced in accordance with the instant invention.

We claim:

1. A photochromic composition of matter consisting essentially of (1) an oxygen-containing, synthetic, organic, thermoplastic polymer selected from the group consisting of polymers of acrylic and methacrylic acid and their esters, styrene polymers, acrylonitrile polymers, acrylamide polymers, vinyl halide polymers, vinylidene halide polymers, olefin polymers, carbonate polymers, vinyl alcohol polymers, vinyl acetate polymers, vinyl butyral polymers, aldehyde polymers, ethylene oxide polymers, cellulose polymers, polyester resins, polyamide resins and polyurethane resins and (2) from about 0.01% to about 50.0%, by weight, based on the weight of (1), of a compound having the formula $$MX_mO_n(OR)_p$$

wherein M is a metal selected from the group consisting of niobium, tantalum, tungsten and hafnium, X is a halide, R is selected from the group consisting of an alkyl radical having from 1–12 atoms, inclusive, an aryl radical having from 6–10 carbon atoms, inclusive, and

TABLE III

| Ex. No. | Polymer | Metal compound | Percent [1] | Solvent | P.C.[2] |
|---|---|---|---|---|---|
| 2 | Poly(styrene) | $TiCl_4$ | 5.0 | Ethyl acetate | Yes. |
| 2a | do | $TiCl_4$ | 3.0 | None | No. |
| 3 | Poly(ethylene) | $ZrBr_4$ | 0.1 | do | No. |
| 4 | Poly(vinylchloride) | $HfI_4$ | 0.5 | Dioxane | Yes. |
| 4a | do | $HfI_4$ | 1.0 | None | No. |
| 5 | Poly(vinylacetate) | $NbF_5$ | 10.0 | Chloroform | Yes. |
| 6 | Poly(oxymethylene) | $TaCl_5$ | 4.0 | None | Yes. |
| 7 | Poly(methyl acrylate) | $WBr_6$ | 0.5 | Dioxane | Yes. |
| 8 | MMA/MA copolymer 60/40 | $TiOCl_2$ | 0.5 | Cyclohexane | Yes. |
| 9 | MMA/AN/ST terpolymer 71/19/10 | $WOCl_4$ | 50.0 | Methylethyl ketone | Yes. |
| 10 | Poly(butylmethacrylate) | $ZrOI_2$ | 0.1 | Gamma-valerolactone | Yes. |
| 11 | Poly(ethyl methacrylate) | $HfOF_2$ | 0.1 | Ethylene dichloride | Yes. |
| 12 | Poly(carbonate)[3] | $NbO_2Cl$ | 0.5 | do | Yes. |
| 13 | Cellulose acetate butyrate | $TaO_2Br$ | 1.0 | Acetone | Yes. |
| 14 | Poly(vinylalcohol) | $WO_2Cl_2$ | 2.0 | Ethylene glycol | Yes. |
| 15 | Poly(vinyl butyral) | $TaOI_3$ | 0.3 | Acetic acid | Yes. |
| 16 | Poly(acetaldehyde) | $TiOF_2$ | 0.4 | Acetone | Yes. |
| 17 | Poly(acrylic acid) | $ZrCl_4$ | 0.5 | Methylethyl ketone | Yes. |
| 18 | Poly(vinylidene chloride) | $HFOBr_2$ | 0.5 | None | No. |
| 19 | Poly(methyl methacrylate) | $NbOI_3$ | 1.0 | do | Yes. |
| 20 | Cellulose triacetate | $WO_2F_2$ | 1.0 | Acetone | Yes. |
| 21 | Thermoplastic polyester resin [4] | $WCl_6$ | 1.0 | Methylethyl ketone | Yes. |
| 22 | Polyamide resin [5] | $Ti(OCH_3)_4$ | 3.0 | Benzyl alcohol | Yes. |
| 23 | Polyurethane resin [6] | $Ta(O\overset{O}{\overset{\|}{C}}-C_6H_5)_5$ | 25.0 | Dimethyl formamide | Yes. |
| 24 | Poly(acrylonitrile) | $CrO_2Cl_2$ | 15.0 | do | Yes. |
| 25 | Poly(acrylamide) | $TiO(OCH_3)_2$ | 0.1 | Ethylene glycol | Yes. |
| 26 | Poly(styrene) | $VOCl_3$ | 3.0 | Ethyl acetate | Yes. |
| 27 | Poly(vinyl acetate) | $WO_2(OC_{12}H_{25})_2$ | 0.5 | None | Yes. |
| 28 | Styrene/acrylonitrile copolymer (75/25) | $ZrBr_2(OC_2H_5)_2$ | 0.5 | Benzene | No. |
| 29 | Poly(methyl methacrylate) | $TiF(OC_{10}H_6)_2$ | 10.0 | None | Yes. |
| 30 | Poly(vinyl chloride) | $VO_2Br$ | 5.0 | Dioxane | Yes. |
| 31 | Thermoplastic polyester resin [4] | $WI_2O\overset{O}{\overset{\|}{C}}-C_{10}H_6)_4$ | 25.0 | Methyl ethyl ketone | Yes. |
| 32 | Poly(ethyl acrylate) | $VO(OC_4H_9)_3$ | 4.0 | Ethylene dichloride | Yes. |
| 33 | Poly(styrene) | $HFI_3(OC_6H_5)$ | 0.1 | Benzene | No. |

[1] Percent, by weight, of metal compound based on polymer.
[2] Photochromic.
[3] Commercially available carbonate resin produced from reacting phosgene with bisphenol A to give product having a structure:

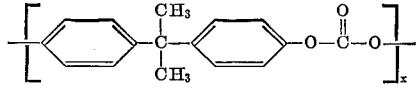

[4] Commercially available polyester resin produced from 50% phthalic acid, 25% diethylene glycol and 25% dipropylene glycol.
[5] Commercially available polyamide resin produced from hexamethylene diamine and adipic acid.
[6] Commercially available polyurethane resin produced by reacting a polyester resin of diethylene glycol, hexanediol-1,3 and phthalic acid with 2,4-toluenediisocyanate.

NOTE: MMA=methyl methacrylate; MA=methyl acrylate; AN=acrylonitrile; ST=styrene.

R' is selected from the group consisting of an alkyl radical having from 1–12 carbon atoms, inclusive, and an aryl radical having from 6–10 carbon atoms, inclusive, $m$ and $p$ are whole positive integers of from 0–6 inclusive, and $n$ is a whole positive integer of from 0–2, inclusive, the total of $2n$ plus $m$ plus $p$ being equal to the valence of the metal M, at least 1 of $m$ and $p$ being an integer of at least 1.

2. A photochromic composition of matter consisting essentially of (1) a synthetic, organic, thermoplastic polymer selected from the group consisting of polymers of acrylic and methacrylic acid and their esters, styrene polymers, acrylonitrile polymers, acrylamide polymers, vinyl halide polymers, vinylidene halide polymers, olefin polymers, carbonate polymers, vinyl alcohol polymers, vinyl acetate polymers, vinyl butyral polymers, aldehyde polymers, ethylene oxide polymers, cellulose polymers, polyester resins, polyamide resins and polyurethane resins, (2) sufficient solvent therefor to produce a solution thereof, and (3) from about 0.01% to about 50.0%, by weight, based on the weight of (1), of a compound having the formula $$MX_mO_n(OR)_p$$

wherein M is a metal selected from the group consisting of niobium, tantalum, tungsten and hafnium, X is a halide, R is selected from the group consisting of an alkyl radical having from 1–12 atoms, inclusive, an aryl radical having from 6–10 carbon atoms, inclusive, and

R' is selected from the group consisting of an alkyl radical having from 1–12 carbon atoms, inclusive, and an aryl radical having from 6–10 carbon atoms, inclusive, $m$ and $p$ are whole positive integers of from 0–6 inclusive, and $n$ is a whole positive integer of from 0–2, inclusive, the total of $2n$ plus $m$ plus $p$ being equal to the valence of the metal M, at least 1 of $m$ and $p$ being an integer of at least 1, at least one of said polymer and said solvent containing oxygen.

3. A composition according to claim 1 wherein said polymer is poly(methylmethacrylate).

4. A composition according to claim 2 wherein said polymer is poly(methylmethacrylate).

5. A composition according to claim 1 wherein said compound is tungsten hexachloride.

6. A composition according to claim 2 wherein said compound is tungsten hexachloride.

7. A composition according to claim 2 wherein said solvent is dioxane.

8. A composition according to claim 2 wherein said polymer is poly(methylmethacrylate), said solvent is dioxane and said compound is tungsten hexachloride.

9. A composition according to claim 1 wherein said polymer is poly(methylmethacrylate) and said compound is niobium pentachloride.

10. A composition of matter according to claim 2 wherein said polymer is poly(methylmethacrylate), said compound is niobium pentachloride and said solvent is ethyl acetate.

References Cited
UNITED STATES PATENTS

| | | | |
|---|---|---|---|
| 3,367,926 | 2/1968 | Volks | 260—94.9 |
| 3,108,091 | 10/1963 | Illing et al. | 260—45.75 |
| 2,777,826 | 1/1957 | Olson | 260—45.75 |
| 2,772,159 | 11/1956 | Elliott | 260—45.75 |
| 3,409,556 | 11/1968 | Brumen et al. | 252—300 |

GEORGE F. LESMES, Primary Examiner

J. P. BRAMMER, Assistant Examiner

U.S. Cl. X.R.

260—45.75